Jan. 17, 1967     D. E. BECKETT ET AL     3,298,747

SUCTION NOZZLE

Filed May 11, 1965

INVENTORS.
DONALD E. BECKETT
ROBIN K. BECKETT

BY J. Warren Kinney Jr.

ATTORNEYS.

3,298,747
SUCTION NOZZLE
Donald E. Beckett and Robin K. Beckett, Wilmington, Ohio, assignors to Beckett-Harcum Company, Wilmington, Ohio, a corporation of Ohio
Filed May 11, 1965, Ser. No. 454,866
5 Claims. (Cl. 302—58)

The present invention relates to an improvement in a suction nozzle, such as might be applied to a suction conveyor tube for gathering and transferring loose material from one location to another.

As an example, the nozzle might be applied to an upright suspended suction tube whose nozzle end may be swung in all directions at various elevations over the bed of a wagon, car, or other vehicle, to remove and transfer to a bin or other receptacle, a load of loose light-weight material brought by the vehicle to an unloading station. The device may be used for unloading or transferring from one location to another, light-weight loose materials such as picked cotton, fluffed asbestos or other insulating materials, and the like.

In the handling of cotton, it is customary to load wagons or other conveyances in the field, and when filled with picked cotton the wagons or conveyances are brought to a gin house or other depository for unloading. The unloading equipment may include a large-diameter suction tube suspended from a beam or other support in such manner that the intake end of the tube may be elevated and lowered, and swung in all lateral directions over the bed of the conveyance, to remove the picked cotton therefrom. The cotton thereby may quickly be transferred by the suction tube, from the conveyance to a location within the gin house, or to any receptacle to be loaded.

At times, the unloading of a vehicle by suction tube is rendered difficult due to compacting of the loose material, particularly at the bottom of the load, as the result of settling or the presence of moisture in the material. In that event, the material requires loosening by agitation before it will readily enter the intake end of the suction tube.

An object of the present invention is to expedite and facilitate the transfer of a light-weight fluffy material by suction means, from one location to another, by continuously agitating and maintaining a loosened condition of the material during the transfer period.

Another object of the invention is to effect substantial savings of time and labor in transferring materials of the type mentioned above.

A further object is to effect transfer of the material by suction means, with safety and convenience, so that the work may be accomplished economically and without injury to workmen concerned therewith.

Another object of the invention is to provide means in association with a suction nozzle, for agitating and loosening a material to be conveyed, and for imparting an initial thrust to the material mechanically aiding entry thereof into the intake mouth of the nozzle.

The foregoing and other objects are attained by the means described herein and illustrated upon the accompanying drawings, in which.

Figure 1:
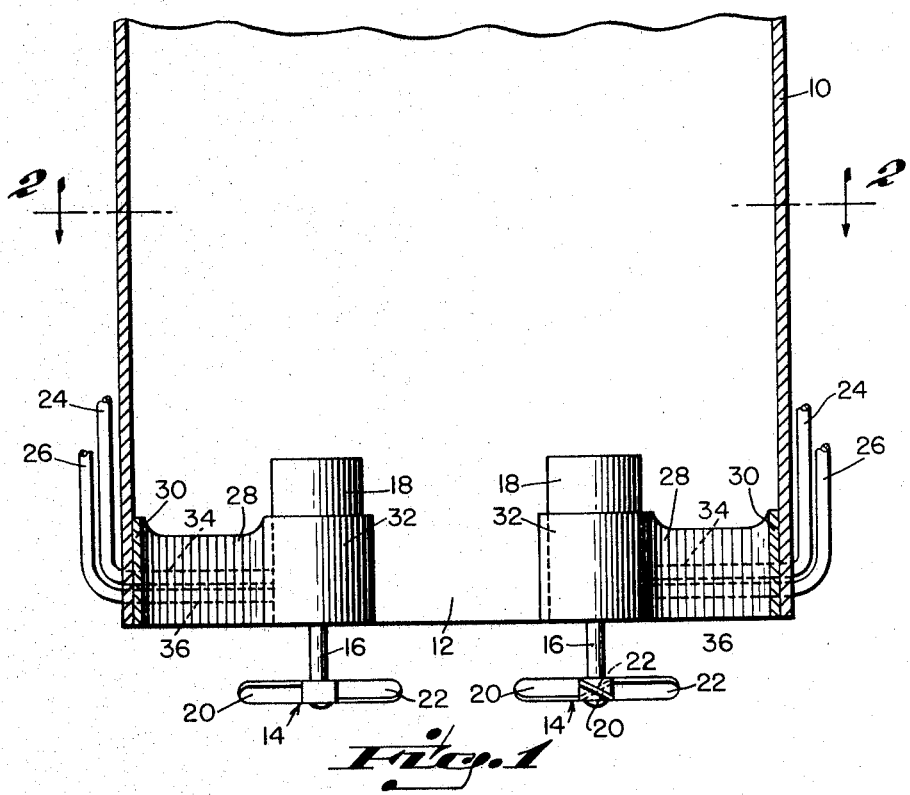
FIG. 1 is a vertical cross-section of the nozzle or intake end of a suspended suction tube, embodying the means of the present invention.
Figure 3:
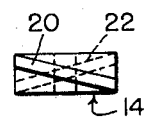
FIG. 3 is an end view of a kicker element for loosening compacted material and thrusting it into the intake end of the nozzle.
Figure 2:
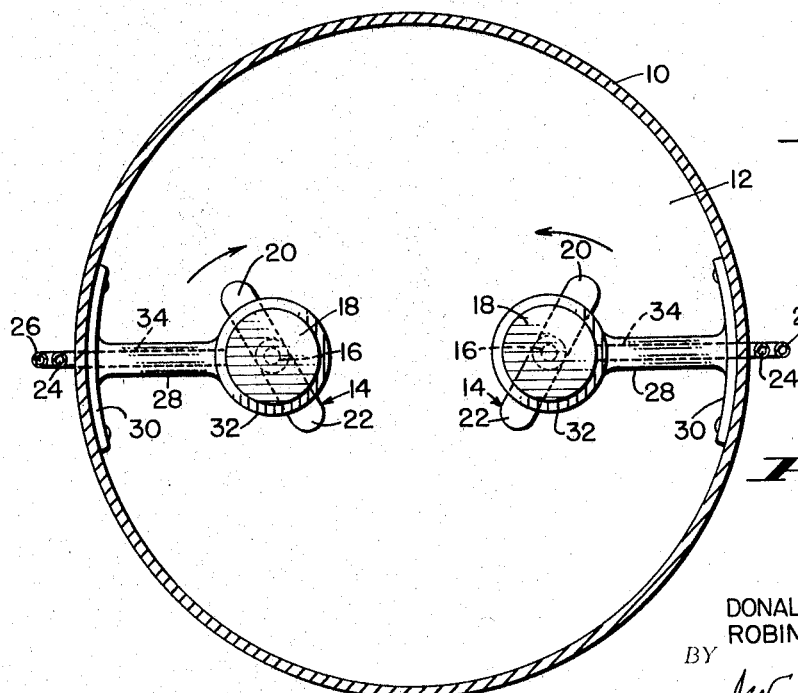
FIG. 2 is a transverse cross-section taken on line 2—2 of FIG. 1.

In the drawings, 10 indicates a suction pipe or tube which may be suspended from an overhead support (not shown), to convey light-weight loose or fluffy material upwardly to a suitable depository such as a bin or storage compartment of any type. The suction tube preferably is so suspended that its intake or open mouth 12 is directed downwardly, and may be swung laterally in all directions over the horizontal surface of a truck or wagon bed located beneath the tube, to lift and transfer material piled upon the bed. The tube may be elevated and lowered with respect to the wagon or truck bed, so that material may be removed progressively from top to bottom of the pile as the level of material upon the bed is reduced incident to removal. An upward flow of air is maintained through the suction tube and its mouth 12, by any conventional air-moving means placed at a location remote from the mouth or nozzle of the tube.

The bed of the truck, wagon, or other surface to be cleared of material, may be traversed by the nozzle end of the tube by hand-manipulation or otherwise, the usual practice being to place the nozzle in the hands of a workman who guides the nozzle over the pile of material in such manner as to most effectively and rapidly reduce the level thereof.

When the normally loose and fluffy material is subjected to undue pressure or humid air during transport, its removal from the wagon or vehicle by the suction tube method is sometimes retarded or rendered difficult due to compacting of the material, particularly near the bottom of the pile. The usual practice under such conditions has been to assign one or more extra workmen to stir or rake the compacted material in advance of the nozzle, in order to prepare it for intake. Such practice was wasteful of time and labor, and was generally unsatisfactory economically.

In accordance with the present invention, the suction tube nozzle is provided with mechanical means operative continuously in advance of the nozzle, for not only loosening the compacted material, but also boosting or thrusting it into the nozzle mouth. Such means may comprise one or more rotary kicker elements 14, located in advance of the nozzle mouth, and adapted to stir and loosen the compacted material and then project it into the nozzle. Each kicker element may include an elongate blade fixedly mounted midway between the ends thereof, upon the rotary shaft 16 of a driving motor 18. The blade may be constructed in simulation of a propeller or air screw, having oppositely angled ends 20 and 22 to dig into the compacted material and throw it toward motor 18. The suction within tube 10 thereupon conveys the material to its destination.

The motors 18 preferably are fluid motors, each having connection with a fluid pressure supply pipe 24 and a return or exhaust pipe 26. Fluid under pressure enters the motor to rotate an internal vaned wheel within the motor housing. Such wheel is fixed upon drive shaft 16, and through the drive shaft, rotates the kicker 14. The fluid motors may be of ordinary construction, and are procurable commercially.

The motors 18 preferably are located within the mouth of the nozzle, and may be supported by brackets 28 having bases 30 screwed, bolted, or otherwise fixed to the inside wall of the nozzle. Each bracket may include a portion 32 to suitably embrace or support a motor, with the motor shaft in substantial parallelism with but offset from the major axis of suction tube 10. The motor shafts, denoted 16, project downwardly through and beyond the mouth opening 12, to support the kickers at a location entirely outside and forwardly of the plane of the mouth opening.

Brackets 28 may be provided with horizontal internal bores or passageways 34 and 36, to carry operating fluid between the motors and their fluid pipes 24, 26, if desired. Of course, the pipes 24, 26, might be led directly to the motors alongside the brackets, as an alternative.

In the preferred construction, the shafts of motors 18, 18, are to be driven in opposite directions of rotation, so as to neutralize the torque forces of the kickers. The kickers so counter-rotated oppose any tendency of the nozzle to ambulate laterally as the kickers engage the material being unloaded. Consequently, the work of guiding the nozzle over the surface of the wagon bed is greatly facilitated, and may be performed with accuracy and a minimum of human effort. In the event that only one kicker is applied to the nozzle, the tendency of the kicker torque to ambulate the nozzle laterally will be evident, but will not render the device inoperative for loosening compacted material and thrusting it into the nozzle mouth as intended. An even number of kickers, rather than an odd number thereof, is to be preferred so that the torque forces of the kickers may be neutralized by counter-rotation. When two kickers are employed, the pitch of one is reversed relative to the pitch of the other.

In constructing the device, the size of the motors and their supporting brackets should be minimal, in order to avoid impeding the flow of material through the mouth of the suction tube. The kickers may include any number of blades, provided that they function to loosen the material to be conveyed, and to project the loosened material upwardly into the mouth of the suction tube. FIG. 1 shows a single blade kicker and an alternative two-blade kicker.

It is to be understood that various modifications and changes may be made in the structural details of the device, within the scope of the appended claims, without departing from the spirit of the invention.

What is claimed is:

1. A suction nozzle for gathering loose light-weight compactable material, said nozzle having a peripheral wall defining an intake mouth, and at least two rotary screw propellers located exteriorly and ahead of said mouth, for loosening compacted material and thrusting the loosened material into the mouth of the nozzle, motors for individually rotating the screw propellers, said motors each including a driving shaft upon which a screw propelller is fixedly mounted, said driving shafts being substantially parallel to the direction of material movement through the nozzle, and rotatable in opposite directions to neutralize the torque forces generated by the screw propellers when rotating.

2. The device according to claim 1, wherein each motor includes a housing, and means supporting the motor housings within the confines of the nozzle, in spaced relation to said nozzle wall.

3. A pneumatic unloader comprising a substantially vertical suction tube having an open lower end serving as a mouth for sucking up loose light-weight compactable material resting upon a substantially horizontal supporting surface, said mouth being traversable over selected areas of the supporting surface and the material resting thereon; at least two rotary air-screw propeller blades located exteriorly and ahead of said mouth, for engaging and loosening and propelling into the mouth, material disposed directly beneath said mouth; motors for individually rotating the propeller blades, said motors each including a driving shaft supporting one of the propeller blades, said driving shafts being substantially parallel to the direction of material movement through the suction tube, and rotatable in opposite directions to neutralize the torque forces generated by the propeller blades when rotating.

4. The device according to claim 3, wherein each motor includes a housing, and means supporting the motor housings within the confines of the suction tube.

5. A pneumatic unloader comprising a substantially vertical suction tube having an open lower end serving as a mouth for sucking up loose light-weight compactable material resting upon a substantially horizontal supporting surface, said mouth being selectively movable toward and from said supporting surface and traversable over selected areas thereof, for clearing the surface of material by suction lift; a pair of fluid-operated motors each including a housing and an outward extending rotary shaft, the shafts being rotatable in opposite directions of rotation and at substantially equal speed; bracket means fixed within the suction tube and having inner ends projected generally toward the tube axis, and means at said inner ends for supporting the motor housings wholly within the confines of the tube mouth, with corresponding outer shaft ends of the motors extended in spaced substantial parallelism with one another and with the tube axis, to a location outside of and beneath the mouth of the tube; a pair of rotary impellers, one fixed to the outer end of each motor shaft, said impellers each including a blade to contact and loosen compacted material resting upon the supporting surface, the blades of the impellers being oppositely pitched and each being located wholly outside the mouth of the suction tube for throwing material into the tube mouth; and fluid pipe means for delivering fluid under pressure to the motors and rotating the shafts thereof in opposite directions to neutralize torque forces of the impellers generated as the impellers rotate.

References Cited by the Examiner

UNITED STATES PATENTS

| | | | |
|---|---|---|---|
| 753,928 | 3/1904 | Sonendriker | 302—58 |
| 2,446,573 | 8/1948 | Cameron | 302—58 |
| 2,499,693 | 3/1950 | Stanton | 302—58 |
| 2,783,098 | 2/1957 | Rooney et al. | 302—58 |
| 3,136,583 | 6/1964 | Griffin | 302—53 |

ANDRES H. NIELSEN, *Primary Examiner.*